Sept. 8, 1970 R. W. BUSHMEYER 3,527,307
TRIPPING AND CUSHIONING MECHANISM FOR EARTHWORKING TOOLS
Filed Aug. 24, 1967 3 Sheets-Sheet 1

INVENTOR.
RICHARD W. BUSHMEYER.
BY
WILSON, SETTLE & BATCHELDER.
ATT'YS.

INVENTOR.
RICHARD W. BUSHMEYER
BY
WILSON, SETTLE &
BATCHELDER.
ATT'YS.

INVENTOR.
RICHARD W. BUSHMEYER.
BY
WILSON, SETTLE & BATCHELDER.
ATT'YS.

United States Patent Office 3,527,307
Patented Sept. 8, 1970

3,527,307
TRIPPING AND CUSHIONING MECHANISM FOR EARTHWORKING TOOLS
Richard W. Bushmeyer, Rockford, Ill., assignor to J. I. Case Company, Racine, Wis., a corporation of Wisconsin
Filed Aug. 24, 1967, Ser. No. 663,131
Int. Cl. A01b 61/04
U.S. Cl. 172—265                                                                                                             10 Claims

ABSTRACT OF THE DISCLOSURE

An implement having a ground engaging tool connected to a supporting frame by a tripping and cushioning mechanism. The tripping and cushioning mechanism includes biasing means for normally maintaining the tool in an earth working position. The biasing means has a motion transmitting mechanism incorporated therein for rotating the tripping and cushioning mechanism relative to the frame whenever an abnormal draft force is encountered by the tool.

BACKGROUND OF THE INVENTION

The present invention relates generally to earth working implements and more particularly to an improved tripping and cushioning mechanism connecting the earth working tool to the support frame of the implement.

The mounting of plow bottoms and the like for tripping under abnormal draft conditions to avoid damaging the plow bottom is well known, and a typical tripping mechanism is capable of being pivoted about a main pivot on the implement frame when an abnormal draft force is encountered. Many of the prior art tripping devices release when a predetermined abnormal draft force is encountered by the working member and will thereafter move to the fully tripped position.

Once the tripped mechanism has been released, it is customary for the operator to return the plow bottom to its operative position by either manually resetting the trip mechanism or by reversing the direction of the implement to utilize the soil or ground to reset the mechanism. This is of course very time consuming and results in a rather inefficient operation.

The more recent developments in tripping mechanism have incorporated self-restoring release or tripping mechanism which would restore the working tool to its operative position after the mechanism has been tripped. However, these devices have been only partially successful in actual use since the devices in most instances require an extreme force for returning the plow bottom to its operative position.

SUMMARY OF THE INVENTION

The primary object of the present invention is to provide a tripping and cushioning mechanism having motion transmitting means interposed between the frame and tool of an implement for pivoting the tool relative to the frame when an abnormal draft force is encountered by the tool.

Another object is to provide a motion transmitting mechanism for a tripping and cushioning assembly that will balance the torque reaction encountered by the assembly throughout the tripping and return cycle.

Other objects and features of the invention will become apparent from the following detailed description taken in conjunction with the accompanying drawings, wherein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
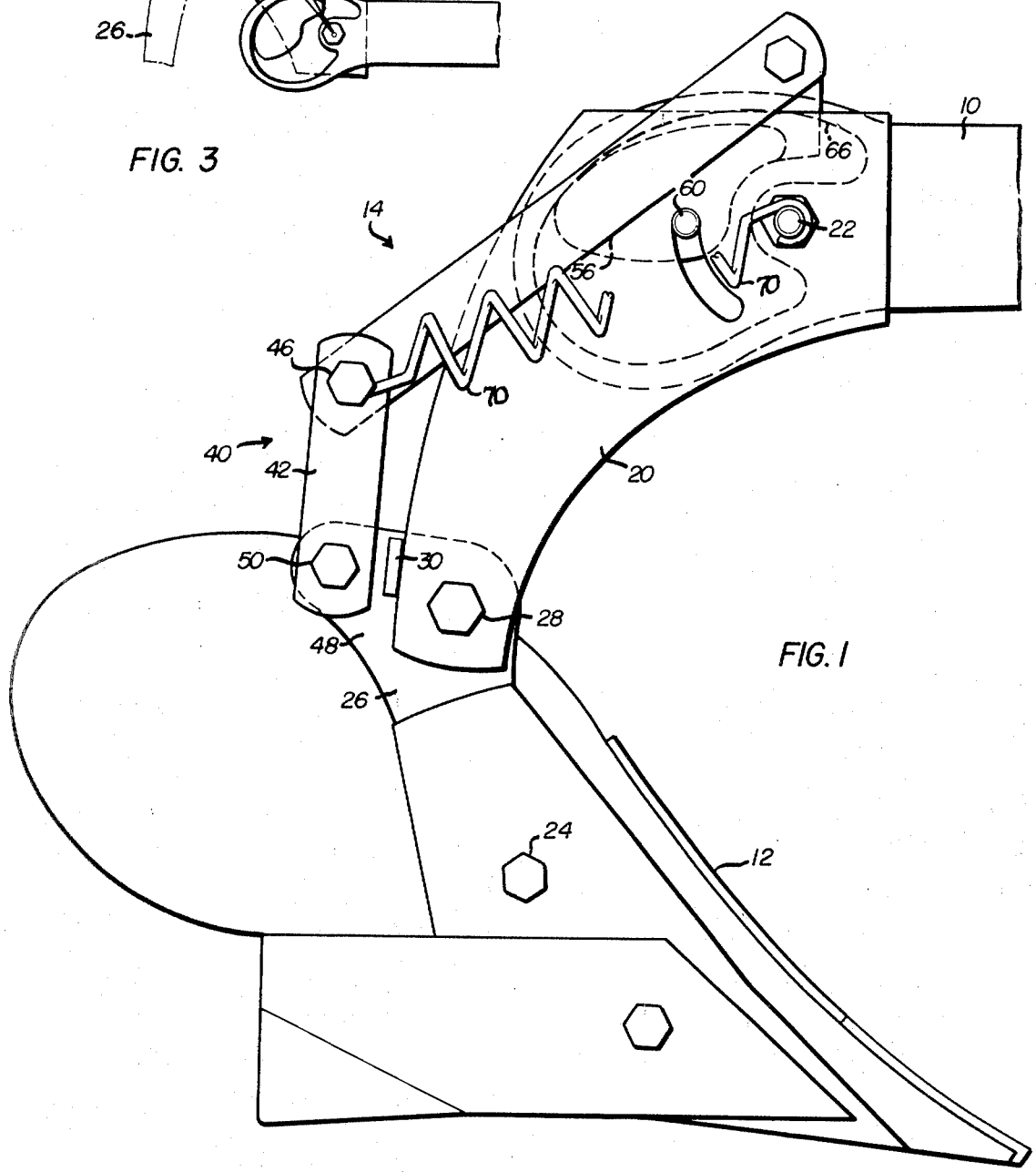
FIG. 1 is a side elevation view of an implement, such as a plow, having the features of the present invention incorporated therein.

With particular reference to the drawings, FIG. 1 shows a fragmentary portion of a conventional earth working implement, such as a plow, having a main beam or supporting frame 10 with an earth working tool, such as a plow bottom 12, connected thereto by a tripping and cushioning mechanism 14 constructed in accordance with the present invention. The tripping and cushioning mechanism 14 includes a pair of spaced side plates 20 supported for pivotal movement on the main beam by a pivot pin or bolt 22 extending through aligned openings in the plates 20 and the beam 10. The two sides plates form a rotatable member or upper section adapted to be pivoted about the pivot pin or main pivot 22.

The plow bottom 12 is fixedly secured by bolts 24 to a plow standard 26 which forms a lower section of the tripping mechanism 14. The plow standard or tool supporting section 26 is supported for pivotal movement about a lower pivot axis defined by a bolt 28 extending through apertures in both of the side plates 20 and in the upper end of the standard 26. The standard 26 also has stop means or lugs 30 which are capable of engaging the rear edges of the side plates 20 to limit the clockwise rotational movement of the plow standard about the lower pivot 28, for a purpose to be described later.

The tripping and cushioning mechanism 14 also includes motion transmitting and biasing means 40 capable of maintaining the plow bottom 12 in an earth working position relative to the main beam 10 when normal draft load forces are encountered by the plow bottom. The motion transmitting and biasing means 40 also is capable of yielding to abnormal draft forces encountered by the plow bottom 12 to allow the plow bottom and the plow standard 26 to move relative to the main beam 10.

Figure 3:
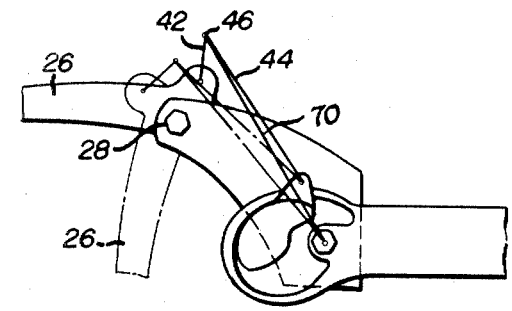
FIG. 3 is a schematic side elevational view showing the tripping and cushioning mechanism in tripped position.
Figure 2:
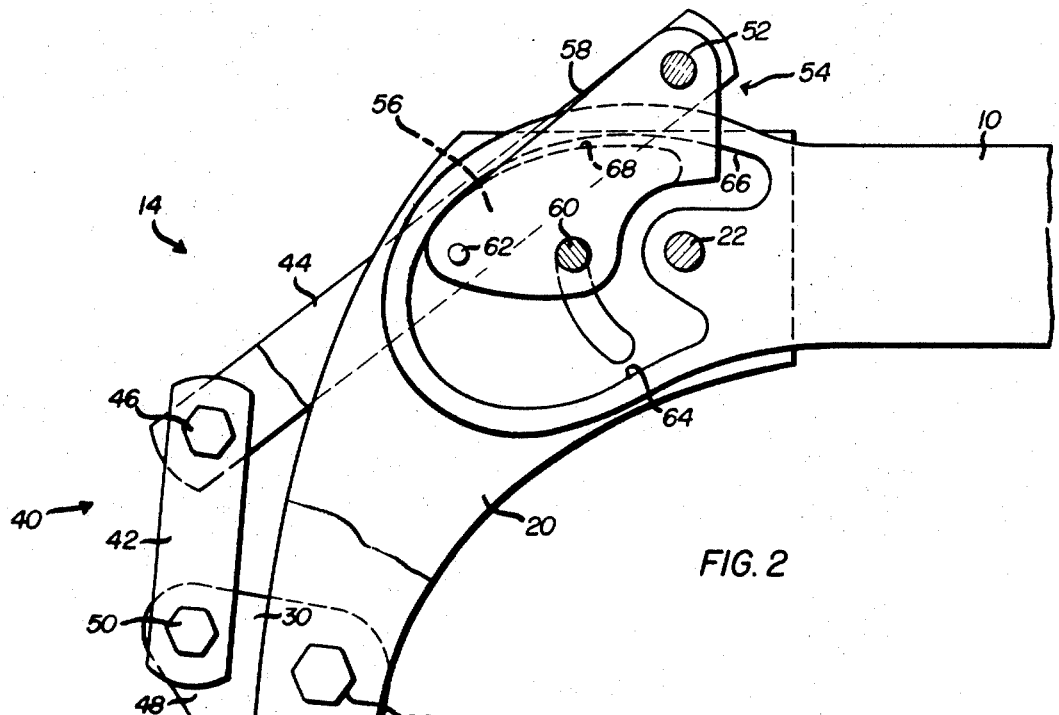
FIG. 2 is an enlarged side elevational view of the tripping and cushioning mechanism with parts thereof broken away for clarity.

In the embodiment illustrated in FIGS. 1 through 3, the motion transmitting and biasing means 40 includes a toggle linkage having first and second links 42 and 44 pivotally interconnected by a pin 46 with one end of the links 42 being pivotally secured to an extension 48 on the plow standard 26 by a pin or bolt 50. The opposite or second links 44 are attached by a pin 52 to a camming mechanism 54, for a purpose to be described later.

The camming mechanism 54 in the embodiment illustrated in FIGS. 1 through 3 is capable of transmitting motion or movement of the plow standard 26 to rotate the plates or rotatable member 20 about the pivot pin 22. Thus, the mechanism 54 includes a camming plate 56 sandwiched between two spaced side plates 58 disposed adjacent opposite outer surfaces of the main beam 10 with the camming plate 56 and plates 58 fixedly secured to each other by bolts or pins 60, 62.

The camming plate or cam 56 is received in an opening 64 defined on the end of the main beam or supporting frame 10. The wall of the opening 64 defines a first camming surface 66 adjacent the upper end thereof which cooperates with a camming surface 68 defined on the outer periphery of the cam 56. The means 40 also includes springs 70 (only one being shown) having opposite ends respectively connected to the bolts 22 and 46. The springs 70 may be assemblies shown in my co-pending application Ser. No. 662,941, File No. 6062, filed with this application.

OPERATION OF FIGURES 1 THROUGH 3 EMBODIMENT

When normal draft forces are applied to the plow bottom 12, the biasing springs 70 will maintain the toggle linkage in its expanded condition shown in FIG. 1 thus having the rotatable member or plates 20 and the plow standard 26 in a position corresponding to the operative position of the plow bottom relative to the main beam.

If an abnormal draft force is encountered by the plow bottom which will tend to rotate the entire tripping and cushioning mechanism about the main pivot point 22, the movement of the standard 26 relative to the beam 10 will be transmitted through the linkage and camming surfaces 66, 68 to rotate plates 20 about pivot 22. This will move the pivots 50, 52 toward each other thereby collapsing the toggle linkage 42, 44 to the position shown in FIG. 3.

When the abnormal draft force on the plow bottom is removed, the spring force on the pivotal connection between the toggle links will move the toggle links to their expanded position shown in the dotted line position of FIG. 3. This will rotate the plow standard 26 counterclockwise about the pivot pin or lower pivot 28 from the solid line to the dotted line position of FIG. 3. This will return the plow bottom to a favorable angle for re-entry into the ground as the tripping mechanism is restored to its normal operative position. Thus, the ordinary draft forces produced by the soil engaging the plow bottom surface will tend to pull the entire tripping and cushioning mechanism to its original operative position.

Should the plow bottom encounter a second abnormal draft force which would tend to move the plow bottom toward the beam 10, the plow standard 26 will be pivoted counterclockwise about the lower pivot 28. This movement of the plow standard 26 will be transmitted through the linkage 40 and the camming surfaces 66, 68 to simultaneously rotate the rotatable member or gusset plates 20 about the main pivot 22. Of course, during this movement the toggle linkage will at all times remain in its expanded condition. Thus, the more the plow standard 26 is rotated counterclockwise about the lower pivot 28, the more the plates 20 will be pivoted clockwise about the main pivot 22.

When the second abnormal draft force is removed from the plow bottom, the plow bottom of course will be at a favorable position for re-entry into the ground. Stated another way, the plow bottom will at all times remain in a position relative to the ground, so that when the abnormal draft force is removed, the normal forces produced by the soil will tend to return the entire unit to its operative position. The specific configuration of the camming surfaces 66, 68 will at all times balance the forces in the tripping and cushioning mechanism as it is being moved from the operative position. This will reduce the amount of spring force required thus making the mechanism readily begin to trip in response to a predetermined abnormal draft force on the tool.

FIGURE 4 EMBODIMENT

Figure 4:
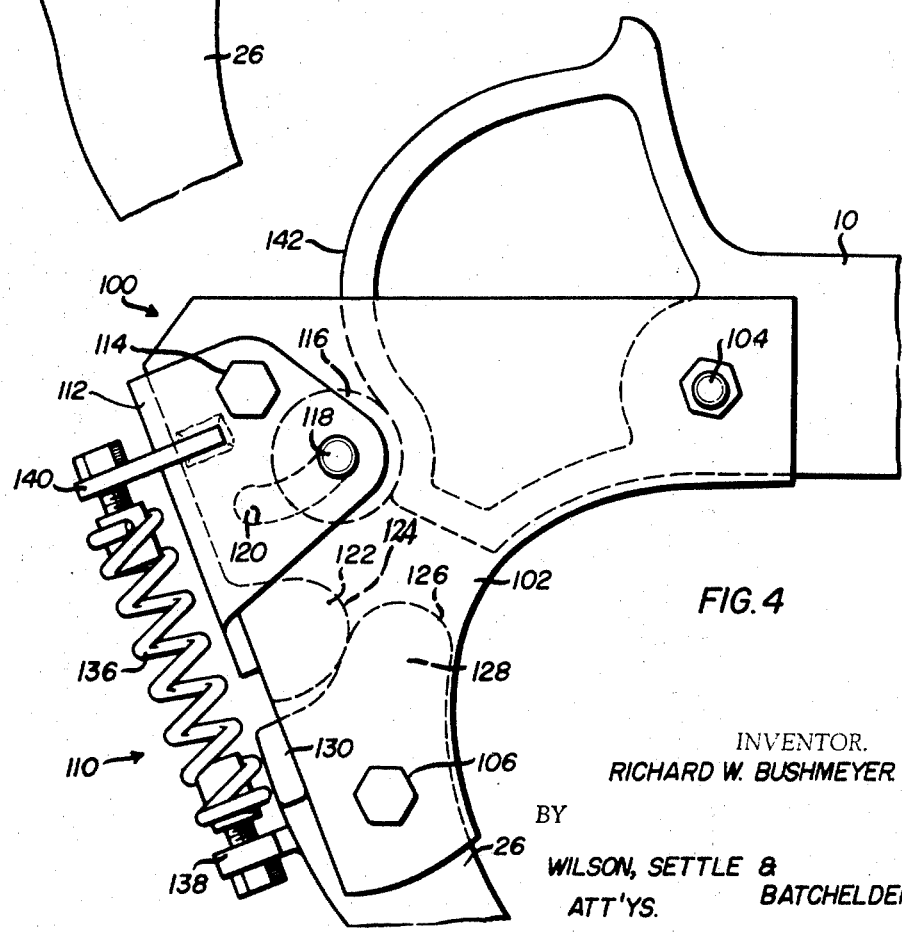
FIG. 4 is a side elevational view similar to FIG. 1 showing a modified form of tripping and cushioning mechanism.

A slightly modified form of tripping and cushioning mechanism is shown in FIG. 4. The tripping and cushioning mechanism 100 of FIG. 4 connects a plow bottom (not shown) through plow standard 26 to the main beam or supporting frame 10. The tripping and cushioning mechanism 100 includes a pair of gusset plates 102 disposed on opposite sides of the main beam 10 and pivotally connected thereto by a pin or bolt 104. The plow standard 26 is disposed intermediate the inner adjacent surfaces of the gusset plates 102 and is pivoted thereon by a lower or second pivot pin 106.

The gusset plates 102 and the plow standard 26 have a motion transmitting and biasing mechanism generally designated at 110. The motion transmitting and biasing mechanism includes a generally U-shaped bracket or member 112 having the legs thereof disposed on opposite sides of the outer surfaces of gusset plates 102 and pivotally connected thereto by a pivot pin or bolt 114. The bracket or member 112 rotatably supports a roller 116 on a pin 118 that is guided in arcuate slots 120 located in each of the gusset plates 102.

The lower end of the bracket or member 112 has an integral extension 122 disposed between the two gusset plates 102. The extension 122 has a camming surface 124 formed on a portion of the outer peripheral surface thereof which is in engagement with a camming surface 126 defined on the extension 128 formed on the plow standard 26.

The plow standard 26 or lower pivot section of the tripping and cushioning mechanism also has a stop 130 which engages the rear end or edges of the gusset plates 102 to limit the clockwise rotational movement of plow standard 26 about pivot pin 106. The plow standard 26, gusset plates 102 and bracket or member 112 are normally maintained in the position shown in FIG. 4 by a tension spring 136 having one end connected to a lug 138 formed on the plow standard 26 and the opposite end connected to a lug 140 welded to the U-shaped member or bracket 112.

The operation of the FIG. 4 embodiment is substantially identical to that described above. Thus, the tension spring 136 produces a force sufficient to counteract normal draft force encountered by the plow bottom (not shown) to maintain the motion transmitting mechanism 110 in the position shown in FIG. 4 with the roller 116 engaging a recessed portion on the camming surface 142 defined on the end of the main beam 10. If the plow bottom encounters an abnormal draft force tending to rotate the plow standard and bottom clockwise relative to the main beam, the rotational movement of the plates 102 about pivot 104 will cause the roller 116 to be moved upwardly on the camming surface 142 defined on the end of the beam 10. Of course, as the roller is moved upwardly along the camming or engaging surface 142 on the beam, the bracket member 112 will be pivoted clockwise about the pivot 114 thus expanding the spring 136 and increasing the force produced by the spring. This increased force is subsequently utilized to return the mechanism to its operative position when the above mentioned abnormal draft force is removed from the plow bottom.

Likewise, when the plow bottom and standard encounters an abnormal draft force which will overcome the force of the spring 136 the plow standard will be rotated counterclockwise about the lower pivot 106 defined on the gusset plates 102 which rotational movement will change the point of contact of the camming surfaces 124, 126 to again pivot the motion transmitting mechanism 112 about the pivot pin 114 thus transmitting the movement of the plow standard through roller 116 and camming surface 142 to rotate the gusset plates 102 about the main pivot 104.

FIGURE 5 EMBODIMENT

Figure 5:
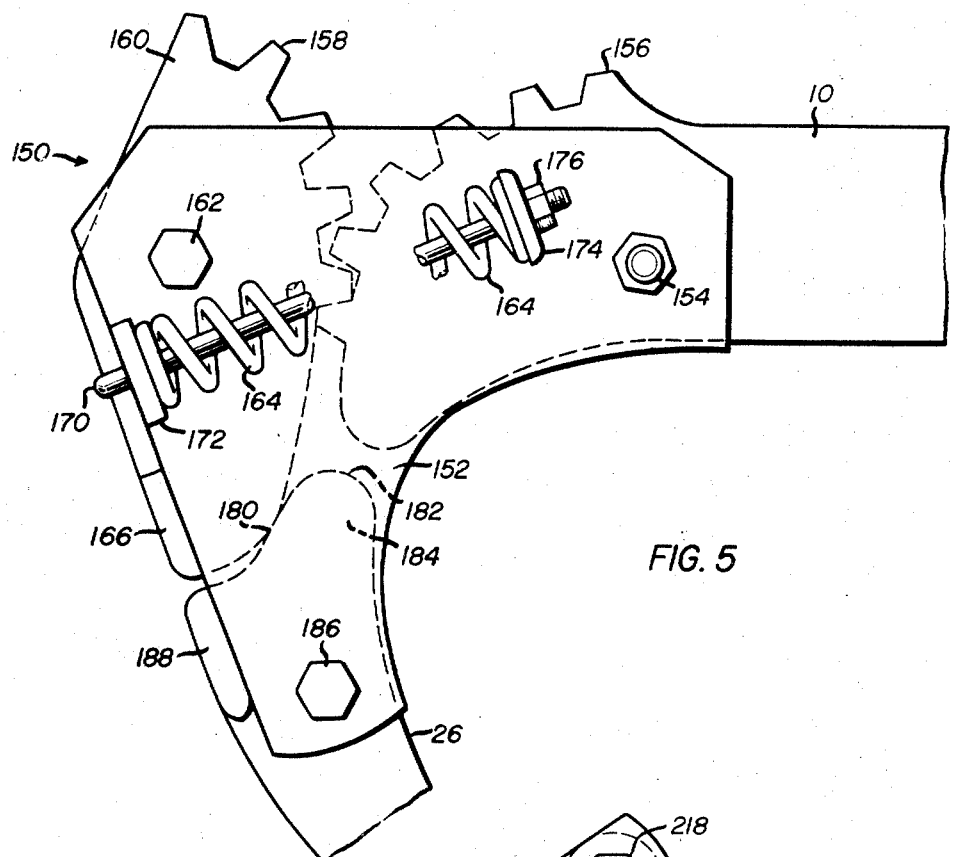
FIG. 5 is a view similar to FIG. 4 showing a further modification of the tripping and cushioning mechanism shown in FIG. 1.

A further modification of the tripping and cushioning mechanism shown in FIG. 1 is illustrated in FIG. 5. The tripping and cushioning mechanism 150 of FIG. 5 includes a pair of gusset plates 152 pivotally supported on a pin 154 carried by the main beam 10 and defining a main or upper pivot point for the tripping and cushioning mechanism. The end of the main beam 10 has an elliptical gear 156 defined thereon which is in constant mesh with a second elliptical gear 158 defined on a member 160. The member 160 is supported for pivotal movement between the two gusset plates 152 by a common pin 162 and is normally biased to the position shown in FIG. 5 by a pair of springs 164 (only one being shown for purposes of clarity).

The springs tend to rotate the member 160 counterclockwise about the pivot 162 to a position shown in FIG. 5 defined by the stop 166 integrally formed with the member 160 and engaging the rear edges of the gusset plates or rotatable member 152. For this purpose, each of the springs is telescoped over a leg of a U-shaped rod 170 having the bite portion thereof engaging or connected to the rear edge of the member 160. The legs of the rod extend through openings in brackets 172 respectively integrally formed on the outer surface of the gusset plates 152. Thus, one end of each spring 164 engages a surface of the bracket 172 while the opposite end is in engagement with a washer 174 telescoped on the leg of the U-shaped rod and maintained thereon by a nut 176 threaded on the free end of the rod.

The lower forward edge of the member 160 has a camming surface 180 coacting with a second camming surface 182 defined on an extension 184 formed on the upper end of the plow standard 26 which of course again is pivoted on a pin 186 carried by the respective gusset plates 152. The plow standard 26 also has a stop 188 adapted to engage the rear edges of the gusset plates 152 to limit the clockwise rotational movement of the plow standard about the pivot pin or lower pivot 186.

The operation of the embodiment shown in FIG. 5 is identical to that described in the two previous embodiments and, thus, it is believed that a detailed description is not necessary.

FIGURE 6 EMBODIMENT

Figure 6:
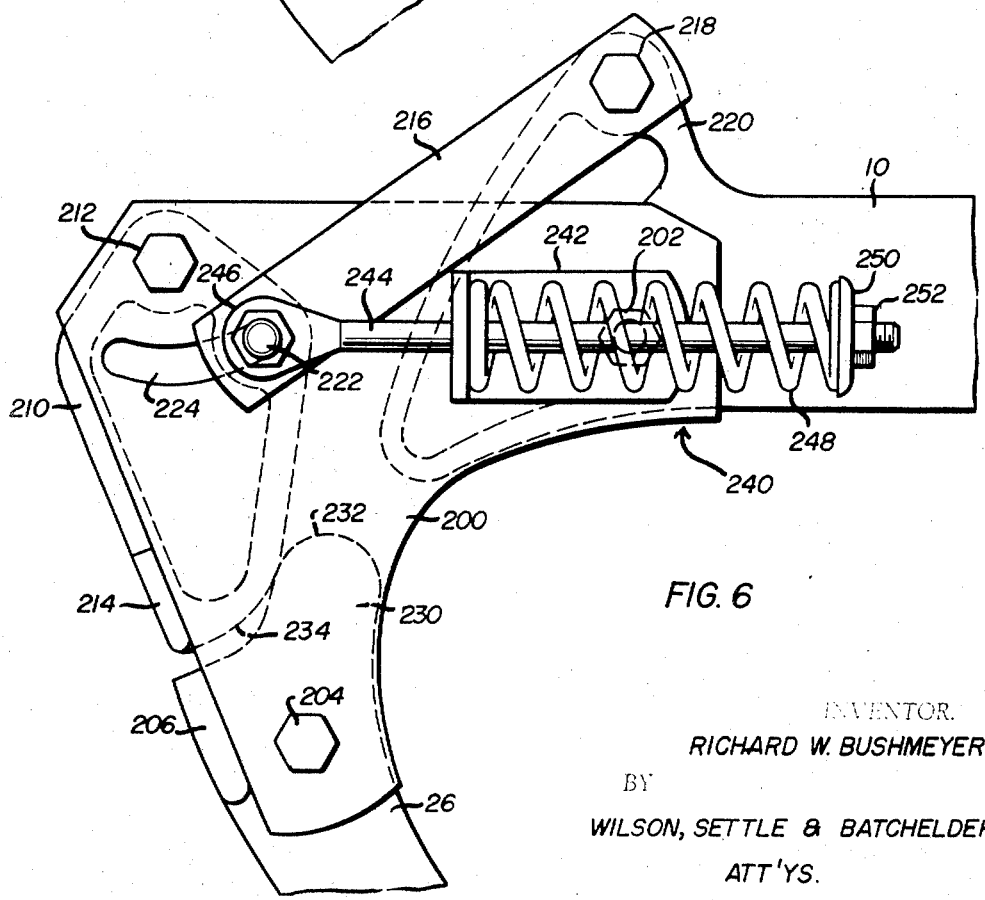
FIG. 6 is still another modified view of the tripping and cushioning mechanism of the invention.

The tripping and cushioning mechanism shown in FIG. 6 includes a pair of gusset plates 200 defining a rotatable member which is supported for pivotal movement on a pin 202 defining a main pivot on the main beam 10. The rotatable member or gusset plates 200 pivotally support the plow standard 26 on a lower or secondary pivot defined by bolt 204. The plow standard 26 also has a stop 206 limiting the clockwise rotational movement of the standard about the lower pivot 204.

The biasing and motion transmitting linkage of the FIG. 6 embodiment includes a member 210 pivotally supported on a bolt 212 between the two plates 200. The lower rear edge of the member 210 has a stop 214 adapted to engage the rear edges of the plates 200 to limit the counterclockwise rotational movement of member 210 about main pivot 212.

The motion transmitting mechanism further includes a pair of links 216 (only one being shown) disposed adjacent the opposite outer surfaces of the respective gusset plates 200 with each of the links having one end connected by a common pin 218 to an extension 220 defined on the main beam 10. The opposite ends of the links 216 are connected by a pin or bolt 222 to the member 210 with the bolt 222 being guided in arcuate slots 224 defined in the respective gusset plates 200 so that the member 210 can be rotated about pivot pin 212, in a manner to be described later.

The motion transmitting mechanism defined by member 210 and links 218 also includes a contacting engagement with the lower standard 26. For this purpose, the upper edge of the standard 26 is provided with an extension 230 having an upper surface 232 defining a first camming surface which is in constant engagement with a camming surface 234 defined on the lower edge of the member 210.

The entire motion transmitting mechanism is biased to the first or operative position shown in FIG. 6 by a pair of spring assemblies 240 (only one being shown). Each of the spring assemblies 240 includes an L-shaped bracket 242 having one leg connected to the main or upper pivot 202 and the second leg apertured to slidably receive a spring rod 244. One end of the rod 244 has an enlarged apertured portion 246 connected to the bolt 222. The rod 244 has a spring 248 telescoped thereon with one end of the spring engaging a surface of the second leg of the bracket 242 while the opposite end of the spring is in contacting engagement with one surface of a washer 250. The washer 250 is maintained on the rod 244 by a nut 252 threadedly received on the free end of the rod. Thus, it is readily apparent that the spring force can readily be adjusted by appropriate rotation of the nut 252.

The operation of the embodiment shown in FIG. 6 is substantially identical to that shown in FIG. 4 and it is believed that a detailed description thereof does not appear to be necessary.

While several preferred embodiments have been shown and described, it is to be understood that various modifications will occur to those skilled in the art.

I claim:

1. In an implement having a support frame element, an earth-working tool and a tripping and cushioning assembly interposed between said tool and one end of said frame element, said assembly including a tool supporting element and a rotatable member means defining an upper pivot on said frame element with said rotatable member pivoted thereon, means defining a lower pivot on said rotatable member with said supporting element on said lower pivot, and biasing means on said assembly for maintaining said tool supporting element and tool in a working position relative to said frame element when normal draft forces are applied to the tool and adapted to yield to abnormal draft forces on the tool, the improvement wherein said biasing means comprises motion transmitting means for pivoting said rotatable member about said upper pivot upon movement of said supporting element from the working position, said motion transmitting means including mechanism movably carried by said rotatable member and cooperating with said frame element end and said supporting element to transmit movement of said supporting element through said rotatable member to said frame element, said mechanism including means defining a first camming surface on one of said elements, and means pivoted on said rotatable member and having a second camming surface cooperating with said first camming surface said last means also cooperating with the other of said elements for transmitting the movement of said supporting element to said rotatable member.

2. An implement as defined in claim 1, in which said first camming surface is defined on said supporting element and said last means includes a plate and a link movable connecting said plate to said frame element end and means biasing said plate and link to a first position corresponding to the working position of said tool.

3. An implement as defined in claim 1, in which said first camming surface is on said supporting element and said last means comprises a gear having gear teeth meshing with gear teeth on said frame element and at least one spring acting on said gear to maintain said tool in the working position.

4. An implement as defined in claim 1, in which said first camming surface is on said frame element end and said last means includes a cam with a collapsible linkage connecting said cam to said supporting element.

5. An implement as defined in claim 1, in which said first camming surface is on said section, and said last means includes a plate pivoted on said rotatable member and having said second camming surface formed thereon, means defining a third camming surface on said frame end, rotatable means on said plate and spring means acting on said plate to maintain said first and second camming surfaces in engagement with each other and said rotatable means in engagement with said third camming surface.

6. In a tripping and cushioning mechanism interposed between an earth working tool and a main beam and wherein said mechanism includes a plate pivoted about a main pivot on said beam a standard supporting said tool and pivoted about a secondary pivot defined on said plate, and biasing means resiliently maintaining said standard and tool in an operative position relative to said main beam, and yielding to abnormal draft forces on the tool, the improvement of said mechanism including motion transmitting means cooperating between said main beam, said standard, and said plate for pivoting said plate about said main beam in response to movements of said standard from the operative position, said last means comprising a member movably mounted on said plate and having a first camming surface defined thereon, means defining a second camming surface on one of said standard and said main beam and engaging said first camming surface, means cooperating with said member and the other of said standard and said main beam for transmitting movement of said standard through said member to said plate, said biasing means acting on at least one of said member and said last means to maintain said member and said last means in a first position corresponding to the operative position of said tool.

7. A tripping and cushioning mechanism as defined in claim 6 in which means defining said second camming surface comprises means defining an opening on the end of said main beam with the portion of the opening wall defining said second camming surface, and in which said member includes a cam received in said opening with said first camming surface defined on the peripheral surface thereof.

8. A tripping and cushioning mechanism as defined in claim 6, in which said second camming surface is defined on said plate and said last means comprises intermeshing gear teeth on said member and an end of said main beam adjacent said main pivot with said biasing means acting on said member.

9. A tripping and cushioning mechanism as defined in claim 6, in which said second camming surface is defined on said standard, means defining a third camming surface on the end of said main beam, and a roller rotatable on said member with said biasing means operatively connecting said member to said standard and maintaining said roller in engagement with the third camming surface whereby movement of said standard will move said member on said plate and increase the bias of said biasing means.

10. A tripping and cushioning mechanism as defined in claim 6, in which said second camming surface is defined on said standard and said last means includes a link operatively connecting said member to said main beam and said biasing means coacts between said main pivot and said member whereby movement of said standard will increase the force of said biasing means, said increased force of said biasing means being sufficient to return said standard and tool to an operative position when the abnormal draft forces are removed.

References Cited

UNITED STATES PATENTS

| | | | |
|---|---|---|---|
| 1,219,342 | 3/1917 | Myers | 172—264 |
| 2,312,405 | 3/1943 | Haagen | 172—264 |
| 3,302,728 | 2/1967 | Sullivan et al. | 172—269 X |
| 3,321,027 | 5/1967 | Johnson et al. | 172—266 |
| 3,420,315 | 1/1969 | Roth | 172—265 |

ROBERT E. PULFREY, Primary Examiner

W. J. CONLON, Assistant Examiner

U.S. Cl. X.R.

172—684, 705, 710, 266, 264